(12) United States Patent
Yamada

(10) Patent No.: US 8,871,661 B2
(45) Date of Patent: Oct. 28, 2014

(54) BONDING MATERIAL

(75) Inventor: Minoru Yamada, Koganei (JP)

(73) Assignee: Sophia Product Co., Toyko (JP)

( * ) Notice: Subject to any disclaimer, the term of this patent is extended or adjusted under 35 U.S.C. 154(b) by 25 days.

(21) Appl. No.: 13/806,868

(22) PCT Filed: Sep. 7, 2010

(86) PCT No.: PCT/JP2010/065267
§ 371 (c)(1),
(2), (4) Date: Dec. 26, 2012

(87) PCT Pub. No.: WO2012/001824
PCT Pub. Date: Jan. 5, 2012

(65) Prior Publication Data
US 2013/0115460 A1  May 9, 2013

(30) Foreign Application Priority Data
Jul. 2, 2010  (JP) ................. 2010-163314

(51) Int. Cl.
*C03C 8/24* (2006.01)
*C03C 8/14* (2006.01)
*C03C 8/18* (2006.01)
*C03C 8/02* (2006.01)
*C09J 1/00* (2006.01)
*C03C 8/04* (2006.01)
*C03C 27/10* (2006.01)

(52) U.S. Cl.
CPC ... *C03C 8/18* (2013.01); *C09J 1/00* (2013.01); *C03C 8/04* (2013.01); *C03C 8/24* (2013.01); *C03C 27/10* (2013.01)
USPC .................... 501/17; 501/15; 501/19; 501/21

(58) Field of Classification Search
CPC .............. C03C 8/02; C03C 8/14; C03C 8/24; C03C 8/245; C03C 8/18; C03C 8/04
USPC .................... 501/14, 15, 17, 19, 21
See application file for complete search history.

(56) References Cited

U.S. PATENT DOCUMENTS

2006/0102228 A1* 5/2006 Sridharan et al. ............. 136/256
2006/0289055 A1* 12/2006 Sridharan et al. ............. 136/252
2009/0101190 A1* 4/2009 Salami et al. ................. 136/244

FOREIGN PATENT DOCUMENTS

JP         2010-47441 A      4/2010
WO    WO 2009/009512 A1     1/2009

* cited by examiner

*Primary Examiner* — Noah Wiese
(74) *Attorney, Agent, or Firm* — Steptoe & Johnson LLP

(57) ABSTRACT

Provided is a bonding material which can bond base materials or substrates having different linear thermal expansion coefficients, and can have heat resistance against temperatures of 300° C. or higher, vacuum airtightness and bonding strength, further which has excellent handleability and workability. The bonding material is produced by mixing, in a content ratio of 0.01 to 60 mass % (to the whole), a metal Ga, and/or at least one metal or alloy powder selected from the group consisting of a metal powder mixture of a combination of Bi and Sn or an alloy powder thereof, and a metal powder mixture of a combination of Bi, Sn and Mg or an alloy powder thereof with a $Bi_2O_3$-based glass frit powder having an average particle diameter of 200 μm or less. The bonding material may be formed in a paste form by adding a solvent thereto. This feature makes it possible to bond together substrates having different thermal expansion coefficients without causing a crack or unsticking.

12 Claims, 2 Drawing Sheets

BONDING MATERIAL

CLAIM FOR PRIORITY

This application claims priority under 35 USC 371 to International Application No. PCT/JP2010/065267, filed on Sep. 7, 2010, which claims priority to Japanese Patent Application No. 2010-163314, filed on Jul. 2, 2010, each of which is hereby incorporated by reference in its entirety.

TECHNICAL FIELD

The present invention relates to a bonding material for bonding between glasses, between a glass and an oxide material such as a ceramic, or between a glass and a quartz glass. Particularly, it relates to a bonding material used for a vacuum container or a bonding part which must be heat resistant and airtight, or a bonding part.

BACKGROUND

A member composed of glasses laminated together is superior in soundproof property, adiathermancy, heat resistance, airtightness and the like, and therefore it has been used as an architectural window glass, and a display glass of TV or the like. In addition, a member composed of a glass and a metal plate which are glued together, or a member composed of a glass and a ceramic material which are glued together has been often used as a substrate for packages including IC chips.

Conventionally, a solder with lead, a lead glass frit, and various filter mediums, brazing sheets, and polymer organic adhesives described in "JIS handbook(3) HITETSU (non-ferrous metal)" have been used as an adhesive in bonding members as described above. However, it is not preferable to use a glass frit and a solder, both containing lead because of environmental concerns, and use of them will be banned in the future.

Japanese Unexamined Patent Publication (JP-A) No. 2001-139345 has suggested, as a lead-free glass frit, a glass composition which comprises: 2 to 20 mol % of $SiO_2$; 15 to 35 mol % of $Bi_2O_3$; 2 to 15 mol % of a component ($LiO_2$, $Na_2O$, or $K_2O$) for lowering a softening point and raising the fluidity; and 20 to 50 mol % of devitrification restraining component (ZnO). JP-A No. 2003-183050 has suggested a lead-free frit made from a $SnO$-$P_2O_5$-based glass powder.

However, the $Bi_2O_3$-based glass frit disclosed in JP-A No. 2001-139345, and the $SnO$-$P_2O_5$-based glass frit disclosed in JP-A No. 2003-183050, involve the problems that the glass may be broken, a crack may be produced in a bonding material, and a phenomenon of unsticking may be caused, in the case of bonding between substrates different from each other in linear thermal expansion coefficient, such as between glasses different from each other in linear thermal expansion coefficient, and between a glass and a ceramic material.

On the other hand, where a polymer organic adhesive agent is used at a high temperature of 250° C. or higher, an organic component thereof is carbonized to weaken the adhesion strength, and thus the airtightness cannot be held.

Therefore, where a conventional lead-free bonding material is used as a bonding material for bonding together base materials or substrates which are different from each other in linear thermal expansion coefficient, it is difficult to achieve the desired heat resistance, airtightness and bonding strength.

DISCLOSURE OF THE INVENTION

Problems that the Invention is to Solve

An object of the invention is to provide a bonding material for bonding between base materials or substrates, or between a base material and a substrate, which are different from each other in linear thermal expansion coefficient, and can achieve a heat resistance against a temperature of 300° C. or higher, vacuum airtightness, and bonding strength, and further has excellent handleability and workability.

Means for Solving the Problems

The inventor attempted to achieve the object mentioned above focusing on the problem that although $Bi_2O_3$-based glass frit is the most reliable among lead-free frits, $Bi_2O_3$-based glass frit can bond only substrates having the same thermal expansion coefficient together. As a result, the inventor found that a bonding material composed of $Bi_2O_3$-based glass frit with a metal powder or an alloy powder, both having a low-melting point, mixed with the glass frit has the effect of relaxing a stress at a bonding interface of a glass substrate bonded with the frit, because the metal or alloy powder has molten at the timing of the frit hardening (at 370 to 550° C.); the bonding material including the metal or alloy having a low-melting point further can have the stress relaxation effect because the metal or alloy having a low-melting point possesses ductility (a smaller Young's modulus than that of the frit); and the bonding material can have the effect of reducing the thermal expansion coefficient. The inventor accomplished the present invention on the basis of the finding alone.

Specifically, the invention is as follows.

(1) A bonding material, comprising:
$Bi_2O_3$-based glass frit containing at least $Bi_2O_3$; and
Ga, and/or at least one metal or alloy powder selected from the group consisting of
BiSn alloy powder,
BiSnMg alloy powder,
a metal powder mixture of Bi powder and Sn powder, and
a metal powder mixture of Bi powder, Sn powder and Mg powder,
wherein the Ga and/or the at least one metal or alloy powder are/is mixed with the $Bi_2O_3$-based glass frit in a content ratio of 0.01 to 60 mass % (to the whole).

(2) The bonding material described in (1), wherein the Ga is mixed with the $Bi_2O_3$-based glass frit containing at least $Bi_2O_3$ in a content ratio of 3 mass % or less.

(3) The bonding material described in (1), wherein the BiSn alloy powder, and/or the metal powder mixture of Bi powder and Sn powder are/is mixed with the $Bi_2O_3$-based glass frit containing at least $Bi_2O_3$ in a content ratio of 3 to 60 mass %.

(4) The bonding material described in (1), wherein the BiSnMg alloy powder (the content of Mg is 0.4 mass % or less), and/or the metal powder mixture of Bi powder, Sn powder and Mg powder (the content of Mg is 0.4 mass % or less) are/is mixed with the $Bi_2O_3$-based glass frit containing at least $Bi_2O_3$ in a content ratio of 3 to 60 mass %.

(5) The bonding material described in (3) or (4), wherein the Bi has a content ratio of 48 to 58 mass %, and the Sn has a content ratio of 42 to 52 mass %.

(6) The bonding material described in (3) or (4), wherein the Bi has a content ratio of 35 mass % or less, and the Sn has a content ratio of 65 mass % or more (the content ratio of Sn cannot be 100 mass %).

(7) The bonding material described in any of (3) to (6), wherein the Ga is further mixed in a content ratio of 0.01 to 3 mass %.

(8) The bonding material described in any of (1) to (7), wherein the bonding material is mixed with a solvent into a paste.

(9) The bonding material described in any of (1), (3), (4), (5), (6), (7) and (8), wherein the metal powder or alloy powder has an average particle diameter of 100 μm or less.

(10) The bonding material described in any of (1) to (9), wherein the $Bi_2O_3$-based glass frit containing at least $Bi_2O_3$ has an average particle diameter of 200 μm or less.

(11) The bonding material described in any of (1) to (10), wherein the $Bi_2O_3$-based glass frit containing at least $Bi_2O_3$ contains 45 to 90 mass % of $Bi_2O_3$ with the balance including $SiO_2$, $B_2O_3$, $Al_2O_3$, ZnO and MgO.

Effect of the Invention

The bonding material of the invention makes it possible to bond substrates having different thermal expansion coefficients without causing a crack or unsticking. This is because stress in the vicinity of a bonding interface can be relaxed by mixing a $Bi_2O_3$-containing glass frit with any of a metal powder of Ga, a metal powder of Bi and Sn, a metal powder of Bi, Sn and Mg, a powder of BiSn alloy, and a powder of BiSnMg alloy, which have ductility specific to metal, on condition that various types of substrates are bonded together. The bonding material has vacuum airtightness comparative to that of a conventional frit, because of containing $Bi_2O_3$-based frit, does not deteriorate in adhesion strength because of having a heat resistance to a temperature of 300° C. or higher, and is environmental friendly and preferable in terms of workers' health because of being lead free.

The bonding material of the invention absorbs a laser light and therefore, it is not necessary to add a black pigment for laser seal in use of laser sealing.

DESCRIPTION OF THE REFERENCE NUMERALS

Figure 1:
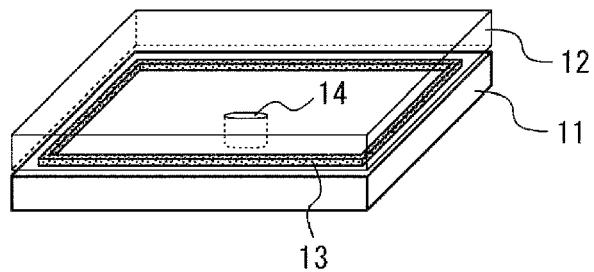
FIG. 1 is a schematic diagram of an airtight container.

11: glass substrate
12: substrate
13: bonding material
14: hole

BEST EMBODIMENTS OF IMPLEMENTING THE INVENTION

The detail of the invention will be described below.
The bonding material of the invention comprises:
$Bi_2O_3$-based glass frit containing at least $Bi_2O_3$; and
Ga, and/or at least one metal or alloy powder selected from the group consisting of
  BiSn alloy powder,
  BiSnMg alloy powder,
  a metal powder mixture of Bi powder and Sn powder, and
  a metal powder mixture of Bi powder, Sn powder and Mg powder, wherein the Ga and/or the at least one metal or alloy powder are/is mixed with the $Bi_2O_3$-based glass frit in a content ratio of 0.01 to 60 mass % (to the whole).

The $Bi_2O_3$ that the glass frit contains is a component for lowering the softening point and raising the fluidity. It is preferable that the content of $Bi_2O_3$ is 45 to 90 mass %, hereinafter referred to as "%", in terms of bondability, and more preferably 50 to 80%, and in particular, preferably 55 to 70%. With 45% or more of $Bi_2O_3$, the fluidity at the time of softening is sufficient, which allows the bonding.

The glass frit contains $SiO_2$ as an essential component in addition to $Bi_2O_3$. The content of $SiO_2$ is 0.5 to 30%, preferably 1 to 20%, and more preferably 2 to 10%. With 0.5% or more, the glass frit is allowed to transition to a glass state, and the softening point does not become excessively high as long as the $SiO_2$ content is 30% or less.

It is desired that the glass frit contains, as other components, ZnO, $B_2O_3$, $Al_2O_3$ and MgO, and further it may contain CuO. Any of these components are not essential. However, each of them may be contained up to 30% for thermal expansion coefficient control. With more than 30%, the softening point is raised. Preferably, it is 20% or below, and in particular, preferably 15% or below.

In addition, $Li_2O$, $Na_2O$, $K_2O$, $Rb_2O$ and $Cs_2O$ as an alkaline metal oxide, and CaO, SrO, BaO and BeO as an alkaline-earth metal oxide may be added to the glass frit respectively up to 15% for the purpose of lowering the softening point.

In the invention, the $Bi_2O_3$-based glass frit containing at least $Bi_2O_3$ can be obtained by pulverizing a $Bi_2O_3$-based frit. An average particle diameter of the frit particles is 200 μm or less, and preferably as large as about 2 to 50 μm. The frit particles having an average particle diameter over 200 μm cannot be mixed with metal uniformly, resulting in uneven bonding. As to the pulverization, it is preferable to use a ball mill to perform the pulverization at an atmospheric temperature.

The first embodiment of the bonding material of the invention can be produced by: pulverizing, to an average particle diameter of 200 μm or less, a $Bi_2O_3$-based glass frit which contains $SiO_2$ of 0.5 to 30%, $Bi_2O_3$ of 50 to 90% and ZnO, $B_2O_3$, $Al_2O_3$, and MgO, and as an option, CuO; and using a mixing machine such as a blender to uniformly mix the resultant glass frit with metal Ga of 3% or less. The metal Ga has a good wettability to frit, and has a melting point (29.8° C.) near a room temperature, and therefore the effect of stress relaxation is achieved even with just a small amount of metal Ga contained. An excessive amount of metal Ga mixed lowers the adhesive strength. Therefore, the amount of metal Ga mixed is preferably 3% or less, more preferably 0.01 to 3%, and in particular, preferably 0.01 to 1%.

The second embodiment of the bonding material according to the invention can be produced by: pulverizing, to an average particle diameter of 200 μm or less, a $Bi_2O_3$-based glass frit which contains $SiO_2$ of 0.5 to 30%, $Bi_2O_3$ of 50 to 90% and ZnO, $B_2O_3$, $Al_2O_3$, and MgO, and as an option, CuO; and using a mixing machine such as a blender to mix the resultant glass frit with at least one metal powder or alloy powder selected from the group consisting of a BiSn alloy pulverized powder, a BiSnMg alloy pulverized powder, a metal powder mixture of Bi powder and Sn powder, and a metal powder mixture of Bi powder, Sn powder, and Mg powder, which have an average particle diameter of 100 μm or less, provided that the content ratio of the at least one metal powder or alloy powder is 3 to 60%.

The mixed powder of Bi powder and Sn powder, the mixed powder consisting of the Bi and Sn mixed powder with Mg powder blended therewith, and the BiSn alloy powder, and the BiSnMg alloy powder, which are mixed with the $Bi_2O_3$-based glass frit, have the stress relaxation effect, and the thermal expansion coefficient reduction effect. Assuming the mixing of Sn alone, Sn has very poor wettability to the frit, so Sn is separated from the frit, and precipitated in the form of Sn fine grains in bonding, and consequently it becomes hard to achieve the stress relaxation and thermal expansion coefficient reduction effects. Assuming the mixing of Bi alone, Bi has good wettability to the frit, but has a melting point of 271° C. which is higher than that of the SnBi alloy, so the stress relaxation and thermal expansion coefficient reduction effects cannot be achieved unless a large amount of bismuth powder is added, and in such a case, a large content of bismuth causes the bonding strength to drop because of the fragility of bismuth. Assuming the mixing of Mg alone, the stress relaxation and thermal expansion coefficient reduction effects cannot be achieved because Mg has a melting point of 650° C. which is higher than that of the frit.

As these metal powders or alloy powders, it is adequate to use metal or alloy powders which have gone through the pulverization to preferably an average particle diameter of 100 μm or less, and more preferably about 2 to 50 μm. As long as the average particle diameter is 100 μm or less, there is no possibility that the metal is exposed from the bonding material in bonding, making a non-uniform bonding.

While the pulverizing method may be of any type of dry or wet, the dry type one is preferred. The pulverizing machine is not particularly limited. For example, a hammer crusher performs a rough pulverization to a few millimeters, and then an impact-type compact pulverizer or a rotary pulverizing machine (mixer) processes the resultant coarse powder into fine powder. In preparing each metal powder mixture, it is sufficient to uniformly mix a metal powder which has been pulverized to 100 μm or below in average particle diameter while using a blender or the like. In preparing each alloy powder, it is sufficient to pulverize an alloy having a desired composition to 100 μm or below in average particle diameter.

The metal powder mixtures or the alloy powders may include: a metal powder mixture consisting of Bi and Sn metal powders mixed in a content ratio of 48 to 58% for Bi, and 42 to 52% for Sn; an alloy powder prepared by pulverizing an alloy of Bi and Sn which Bi and Sn are previously alloyed in the above-described content ratios to form; a metal powder mixture of Bi and Sn metal powders which are mixed in content ratios of 35% or less for Bi and 65% or more for Sn (the content of Sn cannot be 100%); and an alloy powder prepared by pulverizing an alloy of Bi and Sn which Bi and Sn are previously alloyed in the above-described content ratios to form. Among them, the alloy powders are preferable in comparison to the metal powder mixtures because of their easiness of pulverizing and particle size control, and the tendency to make a uniform bonding.

The content ratios of Bi and Sn in the metal powder mixture or alloy powder preferably are in a range of 48 to 58% for Bi, and a range of 42 to 52% for Sn, or a range of 35% or less for Bi and a range of 65% or more for Sn (the content of Sn cannot be 100%). This is because as long as the content ratios of the metals both fall in the ranges, they are easy to form an alloy, and the alloy has a high strength and a low-melting point. In addition, the metal powder mixture or alloy powder has a good wettability to the frit, so the stress relaxation effect is enhanced. In the latter case, more preferable ranges are 0.5 to 15% for Bi, and 85 to 99.5% for Sn, and particularly preferred ranges are 1 to 6% for Bi and 94 to 99% for Sn.

In the present invention, it is preferred to mix the $Bi_2O_3$-based glass frit with a metal powder mixture of Bi, Sn and Mg powders which includes 48 to 58% of Bi, 42 to 52% of Sn, and 0.4% or less of Mg, or an alloy powder of a pulverized BiSnMg alloy having the above-described content ratios in a content ratio of 3 to 60%.

It is also preferable to mix the $Bi_2O_3$-based glass frit powder with a metal powder mixture of Bi, Sn and Mg metal powders which includes 35% or less of Bi, 65% or more of Sn (the content of Sn cannot be 100%), and 0.4% or less of Mg, or an alloy powder of a pulverized BiSnMg alloy having the above-described content ratios.

Mg has the effect of suppressing the separation of Bi and Sn from each other in the metal powder mixture of Bi, Sn and Mg, or the BiSnMg alloy powder to increase the bonding force with the glass. In the case of mixing Mg, an excessively large ratio of Mg to Bi and Sn causes vigorous oxidization, resulting in the lack of adhesion. Therefore, the ratio of Mg in the metal powder mixture or the alloy powder is preferably 0.4% or less, more preferably 0.1 to 0.4%, and in particular, preferably 0.1 to 0.3%.

In the present invention, in the case of mixing the $Bi_2O_3$-based glass frit with the BiSn alloy powder, the BiSnMg alloy powder, the metal powder mixture of Bi powder and Sn powder, or the metal powder mixture of Bi powder, Sn powder and Mg powder, it is preferable to mix them, with respect to the glass frit powder, in a content ratio of 3 to 60%, more preferably 10 to 50%, and in particular, preferably 15 to 45%. With the content ratio below 3%, the stress relaxation effect is lessened. In contrast, with the content ratio over 60%, the glass frit has an excessive metal content, which causes the separation of the metal in bonding, and weakens the bonding strength.

In the present invention, metal Ga in addition to the metal powder mixture or the alloy powder may be mixed to make the bonding material. It is preferable to uniformly mix the metal Ga with the $Bi_2O_3$-based glass frit in a content ratio which is preferably 3% or less, more preferably 0.01 to 3%, and in particular, preferably 0.01 to 1%. Because of the low-melting point of Ga, mixing Ga makes it possible to prepare a bonding material having a further stress relaxation effect. While the metal Ga is effective in any of the case of 48 to 58% of Bi, and 42-52% of Sn, and the case of 35% or less of Bi and 65% or more of Sn, it is preferable to mix metal Ga with 35% or less of Bi and 65% or more of Sn in content ratio, which stabilizes the alloy, lowers the melting point thereof, and increases the bonding strength.

In the present invention, the bonding material may be used in a powder form as it is. However, mixing it with a solvent, such as an alcohol-based solvent, a glycol ether-based solvent, a carbon hydride-based solvent, ketone, or ester to form a paste, the bonding material can be shaped in any place, length, width and thickness by a dispenser method, or a screen printing method. For instance, in case that the bonding material in its powder form is applied as it, the powder thereof is in danger of being dispersed by force of wind, etc.

While the solvent can be appropriately selected, glycol ether-based solvents are preferred as the solvent because of a slow evaporation thereof at room temperature; among them, diethylene glycol monobutyl ether acetate (BCA) is preferred.

In the case of mixing the bonding material with a solvent, it is preferred to mix the metal powder or the alloy powder with the solvent in the ratio of 95:5 to 60:40. An excessive amount of the solvent causes the solvent to ooze, results in the reduction in thickness in the step of applying the bonding material, and tends to cause disconnection. In contrast, an excessively small amount of the solvent results in the increase in the thickness, and tends to produce a film thickness distribution.

For instance, the bonding material of the invention may be used in the following manners.

(Step of Applying the Bonding Material)

One of two members to be bonded together, both subjected to cleaning, is coated with the bonding material which has been mixed with a solvent such as diethylene glycol monobutyl ether acetate (BCA) into a paste at a room temperature to form an appropriate pattern, thickness, width and length.

(Step of Baking the Bonding Material)

The first baking is performed at 300° C. or higher for 10 minutes in the atmosphere to remove the solvent component, followed by cooling to 200° C. or below.

(Step of Superposing One Member on the Other)

The other member is superposed on the one member with the bonding material interposed therebetween.

(Step of Bonding)

The second baking is performed for 10 minutes at 400° C. or higher while applying a pressure, thereby bonding the members together.

While the bonding material may be applied in the condition of powder, it is prone to lose its shape. Therefore, it is desired to use the bonding material in a paste condition.

The bonding material may be applied to one of members or both of the members to be bonded together, and the members can be bonded together in the same manner regardless the former or the latter. The method for the baking may be any process as long as it allows the heating of the bonding materials to an appropriate temperature, which may be timely selected from among a baking furnace, a hot plate, a laser light, and a micro wave.

The temperature of the first baking may be any temperature which causes the solvent to be burnt out. However, it is preferable to bake at 430° C. or higher for 5 minutes or longer time because the reproducibility of the bonding can be enhanced by melting the bonding material once. Likewise, it is preferable for the second baking to bonding the members together to bake at 450 to 500° C.

The time for the bonding varies depending on the bonding process. However, it is preferable to set the time to 10 minutes or longer in the case of a baking furnace, and in the case of performing the bonding by means of laser light of a semiconductor laser, to appropriately set the time according to the wavelength of the laser, the width and thickness of the bonding material.

EXAMPLES

The present invention will be described below further in detail while taking preferred examples. However, the invention is not limited to the examples, and it includes the replacement of each constituent, and the change or modification in design and the order of steps as long as the object of the invention can be achieved.

(Measurement of Average Particle Diameter)

The average particle diameters of the powders were measured by performing an image processing such as binarization on a powder image taken by an optical microscope.

Example 1

A raw material containing 70 mass % of $Bi_2O_3$, 5 mass % of $SiO_2$, 1 mass % of ZnO, 4 mass % of $B_2O_3$, 15 mass % of $Al_2O_3$, and 5 mass % of MgO was molten at a temperature of 1000 to 1400° C. into glass. Subsequently, the resultant glass material was pulverized by a ball mill, and passed through a 30 μm-sieve, thereby producing a glass frit powder having an average particle diameter of about 25 μm. The bonding material in the powder form was prepared by mixing 0.6 g of metal Ga with 99.4 g of the pulverized glass frit uniformly. Further, the bonding material in the paste condition was prepared by mixing 15 g of diethylene glycol monobutyl ether acetate (BCA) with the bonding material in the powder form slowly and uniformly, thereby producing the bonding material in a paste form.

Example 2

Two grams of metal Bi powder and 48 g of metal Sn powder, each having an average particle diameter of 5 μm, were mixed up into 50 g of mixed powder. 50 g of $Bi_2O_3$-based glass frit powder which was similar to the glass frit of Example 1, and had an average particle diameter of about 5 μm, was uniformly mixed with 50 g of mixed powder of metal Bi powder and metal Sn powder. Then, the bonding material in a paste form was prepared in the same way as in Example 1 except for that 30 g of BCA was mixed in.

Example 3

25 g of metal Bi powder and 25 g of metal Sn powder, each having an average particle diameter of 5 μm, were mixed up into 50 g of mixed powder. 50 g of $Bi_2O_3$-based glass frit powder, which was the same as the glass frit of Example 2, and had an average particle diameter of about 5 μm, was uniformly mixed with 50 g of the mixed powder of metal Bi powder and metal Sn powder. Then, the bonding material in a paste form was prepared in the same way as in Example 1 except for that 30 g of BCA was mixed in.

Example 4

19 g of metal Bi powder and 21 g of metal Sn powder, each having an average particle diameter of 5 μm, were mixed up into 40 g of mixed powder. 60 g of $Bi_2O_3$-based glass frit powder, which was the same as that in Example 2, and had an average particle diameter of about 5 μm, was uniformly mixed with 40 g of mixed powder of metal Bi powder and metal Sn powder. Then, the bonding material in a paste form was prepared in the same way as in Example 3.

Example 5

The bonding material in a powder form was prepared by uniformly mixing 59.4 g of $Bi_2O_3$-based glass frit powder, which was the same as that in Example 2, and had an average particle diameter of about 5 μm, with 40 g of mixed powder of 19 g-metal Bi powder and 21 g-metal Sn powder, each having an average particle diameter of about 5 μm, and then uniformly mixing 0.6 g of metal Ga with the resultant powder mixture. The bonding material in a paste form was prepared in the same way as in Example 3.

Example 6

48.85 g of metal Bi powder, 50.85 g of metal Sn powder, and 0.3 g of metal Mg powder, each having an average particle diameter of 5 μm, were mixed up into 100 g of mixed powder. Subsequently, 60 g of $Bi_2O_3$-based glass frit powder, which was the same as that in Example 2, and had an average particle diameter of about 5 μm, was uniformly mixed with 40 g of mixed powder of metal Bi powder, metal Sn powder, and metal Mg powder. Then, the bonding material in a paste form was prepared in the same way as in Example 3.

Example 7

Metal Bi powder and metal Sn powder, each having an average particle diameter of 5 μm, were mixed up in the proportions of 19 g for Bi and 21 g for Sn to prepare 100 g of the mixed powder. Subsequently, 85 g of $Bi_2O_3$-based glass frit powder, which was the same as that in Example 2, and had an average particle diameter of about 5 μm, was uniformly mixed with 15 g of the mixed powder of metal Bi powder, and metal Sn powder. Then, the bonding material in a paste form was prepared in the same way as in Example 3.

Example 8

Two grams of metal Bi powder and 48 g of metal Sn powder, each having an average particle diameter of 5 μm, were mixed up to prepare 50 g of the mixed powder, and then was molten to produce. The bonding material in a powder form was prepared by uniformly mixing 50 g of $Bi_2O_3$-based glass frit powder, which was the same as that in Example 2, and had an average particle diameter of about 5 μm, with 50 g of mixed powder of metal Bi powder, and metal Sn powder, and then uniformly mixing 0.5 g of metal Ga, and the bonding material in a paste form was prepared in the same way as in Example 3.

Example 9

19 g of metal Bi powder and 21 g of metal Sn powder, each having an average particle diameter of 100 μm, were mixed up into 40 g of mixed powder, which was thereafter molten to prepare a BiSn alloy. The molten alloy was cooled, and pulverized to 5 μm in average particle diameter to prepare a BiSn alloy powder. Subsequently, 60 g of $Bi_2O_3$-based glass frit powder, which was the same as that in Example 2, and had an average particle diameter of about 5 μm, was uniformly mixed with 40 g of the alloy powder consisting of metal Bi powder and metal Sn powder, and thereafter the bonding material in a paste form was prepared in the same way as in Example 3.

Example 10

48.85 g of metal Bi powder, and 50.85 g of metal Sn powder, each having an average particle diameter of 100 μm, were mixed up to prepare 99.7 g of mixed powder. The mixed powder is molten into a BiSn alloy, to which 0.3 g of metal Mg powder was added to prepare 100 g of BiSnMg alloy. After cooling, the BiSnMg alloy was pulverized to 5 μm in average particle diameter into BiSnMg alloy powder. Subsequently, 60 g of $Bi_2O_3$-based glass frit powder, which was the same as that in Example 2, and had an average particle diameter of about 5 μm, was uniformly mixed with 40 g of the alloy powder composed of the BiSnMg alloy powder, and thereafter the bonding material in a paste form was prepared in the same way as in Example 3.

<Manufacture of Airtight Container, and Evaluation on Airtightness and Bonding>

The following were used respectively to make airtight containers as shown in FIG. 1, and measurements were performed on the bonding condition and airtightness:

the bonding materials of Examples 1 to 10;

$Bi_2O_3$-based glass frit not containing metal Ga, metal Bi, metal Sn, and the like, as the bonding material of Comparative Example 1;

$SnO-P_2O_5$ based glass frit not containing metal Ga, metal Bi, metal Sn, and the like as the bonding material of Comparative Example 2; and the bonding material in the paste form, as the bonding material of Comparative Example 3, which was prepared in the same way as in Example 3 after uniformly mixing up 50 g of $Bi_2O_3$-based glass frit and 40 g of Sn powder. In FIG. 1, 11 represents a glass substrate, 12 represents a substrate, 13 represents a bonding material, and 14 represents a hole.

Figure 2:
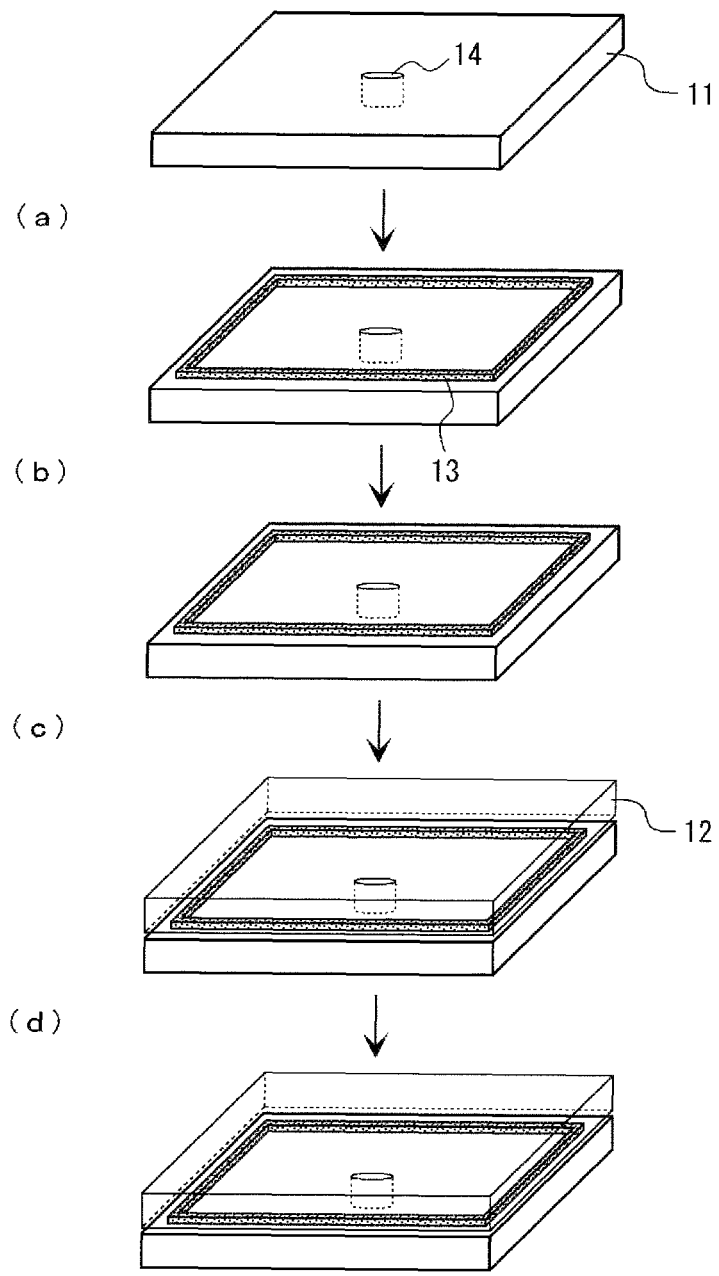
FIG. 2 is a flow chart showing the step of bonding a glass substrate.

A method for producing the airtight container will be described with reference to FIG. 2, a flowchart of the step of bonding a glass substrate.

Used as the glass substrate 11 which is one of two substrates is a glass substrate having a size of 50-millimeter square, a thickness of 2.8 mm, and a hole 14 that is formed in the center, and has a diameter of 3 mm. Used as the other substrate 12 is a glass substrate having the same size, and material property, or a substrate having a different material property and a different thermal expansion coefficient.

Specifically, a soda lime having a thermal expansion coefficient of $85 \times 10^{-7}/°C.$, or a PD200 having a thermal expansion coefficient of $83 \times 10^{-7}/°C.$ is used as the glass substrate 11.

Used as the substrate 12 was a soda lime having a thermal expansion coefficient $85 \times 10^{-7}/°C.$, a PD200 having a thermal expansion coefficient $83 \times 10^{-7}/°C.$, a nonalkali glass having a thermal expansion coefficient of $40 \times 10^{-7}/°C.$, or a quartz glass having a thermal expansion coefficient of 5 to $6 \times 10^{-7}/°C.$ The glass substrate 12 has a size of 50-millimeter square, and a thickness of 1.1 mm.

(a) Step of Applying the Bonding material

The bonding materials of Examples 1 to 8, and the bonding material of Comparative Example 1 were applied individually to a side of the glass substrate 11 by use of a dispenser to measure 1 mm wide by 40 mm long by 1 mm thick.

(b) Step of baking the bonding material

The substrates were each baked at 450° C. for 10 minutes in a baking furnace.

(c) Step of Superposing one member on the other

Then, the other substrate 12 was superposed on the one.

(d) Step of Bonding

While applying a load to the substrates thus paired, the resultant pairs of substrates were each baked at 480° C. for 10 minutes in the baking furnace to form an airtight container. As to the bonding conditions, the appearance was observed about whether there is no crack or break, and an attempt to pull the substrates simply by hands was made to check whether the substrates were unstuck from the paired one.

<Airtightness Test: Helium Leak Test>

The airtight containers produced by use of the bonding materials of Examples 1 to 10, and Comparative Examples 1 to 3 were each connected to a helium leak detector (HELIOT700 manufactured by ULVAC, Inc.)(not shown), and the leakage of helium gas was checked while blowing the helium gas against and around a bonding portion of each airtight container at a room temperature. As a result, the leakage of helium gas was not observed (which remained unchanged at the background level), and the superiority of the bonding material of the invention was confirmed in airtightness. After the airtightness test, an additional airtight test was performed with the airtight containers heated to 300° C. Consequently, the leakage of helium gas was not seen at a high temperature, and it was confirmed that the bonding material of the invention had an excellent airtightness even at a high temperature.

<Stress Measurement: Measurement of Warp>

The airtight containers produced with the bonding materials of Examples 1 to 10 were each put on a platen with the glass substrate 12 located down, and the warps of the produced airtight containers were measured using a thickness gauge having a minimum thickness of 10 μm (not shown). As a result, as to Examples 1, 5, and 8, in which Ga was added, and Examples 6 and 10 in which Mg was added, the warp was 10 μm or less, and the stress was smaller than that in the bonding materials of other examples, and therefore it was confirmed that they were superior in the reduction in stress.

The results of the evaluations are shown in the Table 1.

TABLE 1

| SUBSTRATE 11 | SUBSTRATE 12 | BONDING MATERIAL | BONDING: Made/ Not Made | TENSILE TEST Unstuck/ Sticking | AIRTIGHTNESS $BG < 1 \times 10^{-10}$ Pam$^3$/s | WARP (CLEARANCE GAUGE MEASUREMENT: μm) |
|---|---|---|---|---|---|---|
| SODA LIME THERMAL EXPANSION COEFFICIENT $85 \times 10^{-7}/°C$ | SODA LIME $85 \times 10^{-7}/°C$ | Example 1 | Made | Sticking | =<BG, With no leak | <10 |
| | | Example 2 | ↑ | ↑ | ↑ | ↑ |
| | | Example 3 | ↑ | ↑ | ↑ | ↑ |
| | | Example 4 | ↑ | ↑ | ↑ | ↑ |
| | | Example 5 | ↑ | ↑ | ↑ | ↑ |
| | | Example 6 | ↑ | ↑ | ↑ | ↑ |
| | | Example 7 | ↑ | ↑ | ↑ | ↑ |
| | | Example 8 | ↑ | ↑ | ↑ | ↑ |
| | | Comparative Example 1 | Not made With break & crack | Unstuck | — | — |
| | | Comparative Example 2 | ↑ | ↑ | — | — |
| | | Comparative Example 3 | ↑ | ↑ | — | — |
| | PD 200 $83 \times 10^{-7}/°C$ | Example 1 | Made | Sticking | =<BG, With no leak | <10 |
| | | Example 2 | ↑ | ↑ | ↑ | ↑ |
| | | Example 3 | ↑ | ↑ | ↑ | ↑ |
| | | Example 4 | ↑ | ↑ | ↑ | ↑ |
| | | Example 5 | ↑ | ↑ | ↑ | ↑ |
| | | Example 6 | ↑ | ↑ | ↑ | ↑ |
| | | Example 7 | ↑ | ↑ | ↑ | ↑ |
| | | Example 8 | ↑ | ↑ | ↑ | ↑ |
| | | Example 9 | ↑ | ↑ | ↑ | ↑ |
| | | Example 10 | ↑ | ↑ | ↑ | ↑ |
| | | Comparative Example 1 | Not made With break & crack | Unstuck | — | — |
| | | Comparative Example 2 | ↑ | ↑ | — | — |
| | | Comparative Example 3 | ↑ | ↑ | — | — |
| | NONALKALI GLASS $40 \times 10^{-7}/°C$ | Example 1 | Made | Sticking | =<BG, With no leak | <10 |
| | | Example 2 | ↑ | ↑ | ↑ | ~20 |
| | | Example 3 | ↑ | ↑ | ↑ | ~20 |
| | | Example 4 | ↑ | ↑ | ↑ | ~20 |
| | | Example 5 | ↑ | ↑ | ↑ | <10 |
| | | Example 6 | ↑ | ↑ | ↑ | <10 |
| | | Example 7 | ↑ | ↑ | ↑ | ~20 |
| | | Example 8 | ↑ | ↑ | ↑ | <10 |
| | | Example 9 | ↑ | ↑ | ↑ | ~20 |
| | | Example 10 | ↑ | ↑ | ↑ | <10 |
| | | Comparative Example 1 | Not made With break & crack | Unstuck | — | — |
| | | Comparative Example 2 | ↑ | ↑ | — | — |
| | | Comparative Example 3 | ↑ | ↑ | — | — |
| | QUARTZ GLASS $5-6 \times 10^{-7}/°C$ | Example 4 | Made | Sticking | =<BG, With no leak | ~30 |
| | | Comparative Example 1 | Not Made With no adhesion | Unstuck | — | — |
| | | Comparative Example 2 | ↑ | ↑ | — | — |
| | | Comparative Example 3 | ↑ | ↑ | — | — |
| PD 200 THERMAL EXPANSION COEFFICIENT $85 \times 10^{-7}/°C$ | PD 200 $83 \times 10^{-7}/°C$ | Example 4 | Made | Sticking | =<BG, With no leak | <10 |
| | | Example 9 | ↑ | ↑ | ↑ | ↑ |
| | | Example 10 | ↑ | ↑ | ↑ | ↑ |
| | | Comparative Example 1 | ↑ | ↑ | ↑ | ↑ |
| | | Comparative Example 2 | ↑ | ↑ | ↑ | ↑ |
| | | Comparative Example 3 | ↑ (With Sn fine particle sticking out | Unstuck | With leak | <10 |

TABLE 1-continued

| SUBSTRATE 11 | SUBSTRATE 12 | BONDING MATERIAL | BONDING: Made/ Not Made | TENSILE TEST Unstuck/ Sticking | AIRTIGHTNESS BG < 1 × 10⁻¹⁰ Pam³/s | WARP (CLEARANCE GAUGE MEASUREMENT: μm) |
|---|---|---|---|---|---|---|
|  | NONALKALI GLASS 40 × 10⁻⁷/° C. | Example 4 | Made (from a bonding portion) | Sticking | =<BG, With no leak | ~20 |
|  |  | Example 9 | ↑ | ↑ | ↑ | ~20 |
|  |  | Example 10 | ↑ | ↑ | ↑ | <10 |
|  |  | Comparative Example 1 | Not made With break & crack | Unstuck |  | — |
|  | QUARTZ GLASS 5-6 × 10⁻⁷/° C. | Example 4 | Made | Sticking | =<BG, With no leak | ~30 |
|  |  | Example 9 | ↑ | ↑ | ↑ | ↑ |
|  |  | Comparative Example 1 | Not made With break & crack | Unstuck |  | — |

INDUSTRIAL FIELD OF APPLICATION

The bonding material of the present invention is not only excellent in adhesiveness and bondability between a glass and a glass, between a glass and an oxide material such as a ceramic, and between a glass and a metal such as various stainless steels and copper, and the airtightness and heat resistance, but also superior in the workability in applying, easy to handle, and available for bonding and adhesion in a wide range of applications.

The invention claimed is:

1. A bonding material for bonding between members comprising:
   $Bi_2O_3$-based glass frit containing at least $Bi_2O_3$; and
   at least one powder selected from the group consisting of BiSn alloy powder and a metal powder mixture of Bi powder and Sn powder, wherein
   the BiSn alloy powder, and/or the metal powder mixture of Bi powder and Sn powder are/is mixed with the $Bi_2O_3$-based glass frit containing at least $Bi_2O_3$ in a content ratio of 3 to 60 mass % (to the whole).

2. A bonding material for bonding between members comprising:
   $Bi_2O_3$-based glass fit containing at least $Bi_2O_3$; and
   at least one powder selected from the group consisting of BiSnMg alloy powder and a metal powder mixture of Bi powder, Sn powder and Mg powder, wherein
   the BiSnMg alloy powder (the content of Mg is 0.1-0.4 mass %), and/or the metal powder mixture of Bi powder, Sn powder and Mg powder (the content of Mg is 0.1-0.4 mass %) are/is mixed with the $Bi_2O_3$-based glass fit containing at least $Bi_2O_3$ in a content ratio of 3 to 60 mass % (to the whole).

3. The bonding material according to claim 1 wherein the Bi has a content ratio of 48 to 58 mass %; and the Sn has a content ratio of 42 to 52 mass % in the metal powder mixture or the alloy powder.

4. The bonding material according to claim 1, wherein the Bi has a content ratio of 35 mass % or less, and the Sn has a content ratio of 65 mass % or more (the content ratio of Sn cannot be 100 mass %) in the metal powder mixture or the alloy powder.

5. A bonding material for bonding between members comprising:
   $Bi_2O_3$-based glass frit containing at least $Bi_2O_3$; Ga; and
   at least one powder selected from the group consisting of BiSn alloy powder and a metal powder mixture of Bi powder and Sn powder, wherein
   the BiSn alloy powder, and/or the metal powder mixture of Bi powder and Sn powder are/is mixed with the $Bi_2O_3$-based glass frit containing at least $Bi_2O_3$ in a content ratio of 3 to 60 mass % (to the whole); and the Ga is further mixed in a content ratio of 0.01 to 3 mass % (to the whole).

6. The bonding material according to claim 1 or 2, wherein the bonding material is mixed with a solvent into a paste.

7. The bonding material according to claim 1 or 2, wherein the metal powder or alloy powder has an average particle diameter of 100 μm or less.

8. The bonding material according, to claim 1 or 2, wherein the $Bi_2O_3$-based glass fit containing at least $Bi_2O_3$ has an average particle diameter of 200 μm or less.

9. A bonding material for bonding between members comprising $Bi_2O_3$-based glass frit containing at least $Bi_2O_3$, wherein the
   $Bi_2O_3$-based glass fit containing at least $Bi_2O_3$ contains 45 to 90 mass % of $Bi_2O_3$ with the balance including $SiO_2$, $Bi_2O_3$, $Al_2O_3$, ZnO and MgO; and
   at least one powder selected from the group consisting of BiSn alloy powder, BiSnMg alloy powder, a metal powder mixture of Bi powder and Sn powder and a metal powder mixture of Bi powder, Sn powder and Mg powder; and/or Ga metal,
   wherein the powder and/or the Ga metal are included in a content ratio of 0.01 to 60 mass % (to the whole).

10. The bonding material according to claim 2, wherein the Bi has a content ratio of 48 to 58 mass %, and the Sn has a content ratio of 42 to 52 mass % in the metal powder mixture or the alloy powder.

11. The bonding material according to claim 2, wherein the Bi has a content ratio of 35 mass % or less, and the Sn has a content ratio of 65 mass % or more (the content ratio of Sn cannot be 100 mass %) in the metal powder mixture or the alloy powder.

12. The bonding material according to claim 2, wherein the Ga is further mixed in a content ratio of 0.01 to 3 mass %.

* * * * *